United States Patent [19]
Cooper et al.

[11] Patent Number: 6,096,283
[45] Date of Patent: Aug. 1, 2000

[54] INTEGRATED SYSTEM FOR THE DESTRUCTION OF ORGANICS BY HYDROLYSIS AND OXIDATION WITH PEROXYDISULFATE

[75] Inventors: John F. Cooper, Oakland; G. Bryan Balazs, Livermore; Peter Hsu, Pleasanton; Patricia R. Lewis, Livermore; Martyn G. Adamson, Danville, all of Calif.

[73] Assignee: Regents of the University of California, Oakland, Calif.

[21] Appl. No.: 09/055,029

[22] Filed: Apr. 3, 1998

[51] Int. Cl.[7] .............................. C01C 3/00; A62D 3/00; C02F 1/72

[52] U.S. Cl. ..................... 423/437.1; 588/206; 210/758; 210/759; 210/908

[58] Field of Search .......................... 423/437.1, DIG. 3, 423/DIG. 11; 588/206, 213, 226, 204, 207, 208; 210/758, 759, 909, 908, 762

[56] References Cited

U.S. PATENT DOCUMENTS 4,416,786  11/1983  Knorre et al. .......................... 210/746
5,232,604   8/1993  Swallow et al. ........................ 210/759
5,492,634   2/1996  Hong et al. ............................. 210/761

OTHER PUBLICATIONS

"Alternative Technologies for the Destruction of Chemical Agents and Munitions", Committee on Aternative Chemical Demilitarization Technologies. National Academy Press, Washington DC. pp. 124, and 190, 1993.

*Primary Examiner*—Steven P. Griffin
*Assistant Examiner*—Maribel Medina
*Attorney, Agent, or Firm*—Alan H. Thompson; Daryl S. Grzybicki

[57] ABSTRACT

An integrated system for destruction of organic waste comprises a hydrolysis step at moderate temperature and pressure, followed by direct chemical oxidation using peroxydisulfate. This system can be used to quantitatively destroy volatile or water-insoluble halogenated organic solvents, contaminated soils and sludges, and the organic component of mixed waste. The hydrolysis step results in a substantially single phase of less volatile, more water soluble hydrolysis products, thus enabling the oxidation step to proceed rapidly and with minimal loss of organic substrate in the off-gas.

15 Claims, 1 Drawing Sheet

INTEGRATED SYSTEM FOR THE DESTRUCTION OF ORGANICS BY HYDROLYSIS AND OXIDATION WITH PEROXYDISULFATE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the destruction of organic waste using an integrated system of hydrolysis and direct chemical oxidation with peroxydisulfate.

2. Description of Related Art

Destruction of organic waste through conventional thermal techniques, such as incineration, often encounters regulatory or political hurdles, especially when the waste streams contain radionuclides or chlorinated hydrocarbons. Treatment of waste streams containing polychlorinated biphenyls (PCBs) is particularly difficult due to their inertness, persistent biological toxicity, and the possibility of formation of dioxins or furans. When the waste stream is mixed waste, the problem is compounded by the possible volatilization or other release of radionuclides into the environment. For these reasons, alternatives to traditional thermal (>350° C.) organic waste treatment technologies are being developed, e.g., acid digestion and oxidation using multiple catalysts.

One alternative method is mediated electrochemical oxidation (MEO), which is based on the oxidation of organics to carbon dioxide through a series of charge transfer steps involving a mediator. The mediator is a transition metal in a high valency state. The MEO system is limited in the variety of chemical functional groups that can be treated. Furthermore, MEO requires the use of toxic, expensive, and degradable catalysts such as Ag(II) or Co(III). These metals can be lost by precipitation or by entrainment in secondary waste streams, which can then require special and costly disposal.

For certain types of organic waste, such as carbon residues in incinerator ash and mixed waste chlorinated solvents, there are no practical low temperature treatments available. The government and the commercial sector are stockpiling waste until suitable methods can be found to treat or store this waste, and thus there is an urgent need to develop such methods. Waste treatment methods are needed that can be performed at relatively low cost and are more "omnivorous", that is, having the reactivity and oxidizing power to destroy a wide variety of organics.

Many halogenated organic liquids, such as solvents, are difficult to destroy because of their high volatility and limited solubility in water, and a system is needed that circumvents these problems and converts volatile or insoluble wastes into a water soluble, less hazardous, treatable form. In addition, since thermal treatment methods can possibly generate dioxins and furans when treating PCBs, a non-thermal (i.e., <350° C.) technique is desired. Treatment methods should avoid the use of dangerous or toxic gases or highly acidic solutions, and should minimize the secondary waste generated, given the enormous volumes of waste to be destroyed.

It is the object of the present invention to address the problems inherent in the conventional systems and provide a non-thermal, aqueous process that efficiently remediates the organic component of hazardous or mixed wastes while minimizing the economic and environmental costs of a waste treatment system.

SUMMARY OF THE INVENTION

The present invention is an integrated system that combines two chemical processes to rapidly destroy waste organics such as halogenated organic solvents. The first process is hydrolysis, which converts the organic waste into water soluble products to form a substantially single phase solution. Hydrolysis is accomplished in a pressure vessel at elevated temperature and ambient to elevated pressure. The use of a sealed vessel with minimal headspace avoids the loss of organic substrate due to volatilization, while the operation at elevated temperature allows the achievement of practical throughputs. Subsequent to this step, the hydrolyzed organic is completely converted to carbon dioxide, water, and inorganic residues in a direct chemical oxidation reactor system.

The direct chemical oxidation reactor system consists of multiple reactors with solutions of peroxydisulfuric acid ($H_2S_2O_8$) or its salts (containing the anion $S_2O_8^{2-}$) to oxidize the organic waste at temperatures of about 20–105° C. and atmospheric pressure. In the destruction of chlorinated hydrocarbons, chlorine gas is released, which can be reconverted to chloride ion in a scrubber, while the carbon dioxide released is vented to the atmosphere. Systems have been designed for a destruction and removal efficiency (DRE) of 99% for operation with two reactors, and greater than 99.5% with three reactors in operation. Secondary wastes may be avoided by electrochemically recycling the expended oxidant back into peroxydisulfate. Since peroxydisulfate salts can be stored almost indefinitely at room temperature or slightly below, the process of waste destruction can be decoupled in time and place from the generation of the peroxydisulfate oxidant.

The present process and reactor system have been developed for applications in waste treatment, chemical demilitarization, and decontamination. The process is useful in the total oxidative destruction of nearly any organic solid or liquid: solvents (including PCBs, halogenated solvents, and mixed waste analogs of these), detergents, pesticides, water-insoluble oils or greases (e.g., Trimsol), charcoal filter media, incinerator chars and tars, paper (cellulose), stable or recalcitrant organic complexes such as porphyrins and other macrocyclic compounds, plastics like polyethylene (except perfluorinated polymers), latex mixed waste, wastes containing free halide, nitrate, phosphate, sulfate, or carbonate ions, and organics immobilized in organic or inorganic matrices such as soils, sands or sludges. Solutions of the oxidant can be used to treat inaccessible wastes (such as radioactively-contaminated organics within metal machinery, glove boxes, or weapons components); or as a surface etching agent for contaminated metal or plastic equipment or decontamination of buildings; or for destruction of biological or chemical warfare agents, explosives and propellants with a minimum of secondary waste generation.

A unique application of peroxydisulfate, for which there is no practical alternative low temperature treatment, is the destruction of carbon residues in incinerator ash at Rocky Flats and elsewhere. Ammonium peroxydisulfate can attack and destroy recalcitrant materials such as dyes and colorants, graphite, coal dust, metal carbide, charcoal, and carbon residuals found in such incinerator ashes. Because peroxydisulfate requires no catalyst, its use is compatible with the inorganic content of common ashes. This waste treatment technique is also effective at government facilities which have a need for the destruction of tributyl phosphate and ion exchange resins.

Other objects and advantages of the present invention will become apparent from the following description and accompanying drawing.

BRIEF DESCRIPTION OF THE DRAWINGS

The accompanying drawing, which is incorporated into and forms part of this disclosure, illustrates an embodiment of the invention and together with the description, serves to explain the principles of the invention.

The FIGURE shows schematically an integrated system for hydrolysis and direct chemical oxidation according to the present invention.

DETAILED DESCRIPTION OF THE INVENTION

Figure 1:
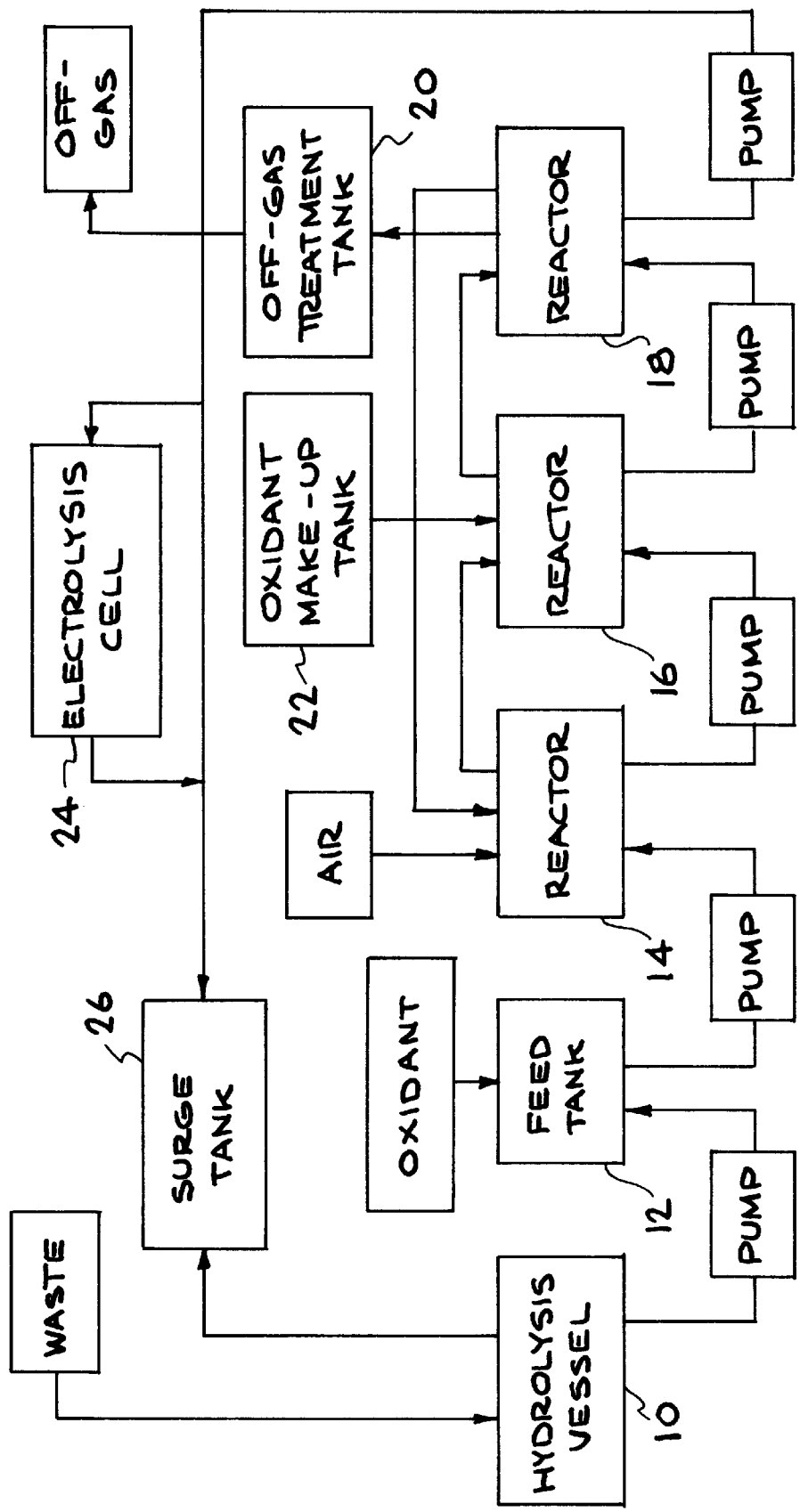

The present invention is a system for the non-thermal (i.e., <350° C.) destruction of a diverse group of organic waste matrices. This system, shown schematically in the FIGURE, integrates two separate and distinct processes: hydrolysis and direct chemical oxidation with peroxydisulfate. The first step is hydrolysis of the organics, which is performed at elevated temperatures in a sealed reactor with minimal headspace to retain volatile compounds. Following this step, the resultant products, which are generally more water soluble and less volatile, are mineralized in a process known as Direct Chemical Oxidation (DCO). The DCO technology uses aqueous solutions of the oxidant peroxydisulfate at temperatures of about 20–105° C. to oxidize the hydrolysis products to carbon dioxide, water, and inorganic residues. Peroxydisulfate is in the form of peroxydisulfuric acid ($H_2S_2O_8$) or its salts (containing the anion $S_2O_8^{2-}$). If desired, the expended oxidant can be recycled electrochemically to minimize secondary waste.

The present method is effective on contaminated sludges, sands, and soils; organic solids; and liquid organics (either miscible with water or not), including halogenated organic liquids (e.g., 1,1,1-trichloroethane, trichloroethylene, perchloroethylene, and polychlorinated biphenyl compounds) that are difficult to treat conventionally due to their high degree of chlorination and limited solubility in water. Because of the physical and chemical operating parameters of the present system, the invention is also applicable to the treatment of the organic components of mixed waste.

Hydrolysis

The present method begins with either neutral or base hydrolysis of the waste organics in aqueous media under conditions of increased temperature. The aim of the hydrolysis step is to produce a substantially single liquid phase for subsequent oxidation in an aqueous phase. Volatile and insoluble organics are converted to hydrolysis products that are more water soluble and less volatile. For example, the hydrolysis of 1,1,1-trichloroethane produces acetic acid, as given in Equation 1:

$$CH_3CCl_3 + 2H_2O \Longrightarrow CH_3COOH + 3H^+ + 3Cl^- \quad (1)$$

By raising the temperature of the hydrolysis vessel 10, and operating in a sealed system with minimal headspace, the hydrolysis reaction can be completed in a matter of hours. Subsequent oxidation of the hydrolysis products by direct chemical oxidation results in quantitative conversion of a chlorinated organic to carbon dioxide, water, and chlorine. The rate of oxidation of organics by peroxydisulfate is very high at temperatures of about 70–100° C., being essentially mass transport limited, so providing a single aqueous phase by hydrolysis is critical.

Depending on the halogenated organic, the hydrolysis is achieved through either a reaction with water or hydroxide ions. Neutral to basic (pH≧7) conditions may be chosen for several reasons, particularly for the integrity of the hydrolysis vessel. During the hydrolysis reaction, protons and halide atoms are released, which leads to more rapid attack on a vessel constructed of stainless steel. Since the reaction vessel operates at elevated pressure and temperature, it is prudent for safety reasons to insure that the pH of the contents of the hydrolysis vessel are maintained at a high value so the corrosion is less severe. Experimentally, it has been found that the hydrolysis reaction proceeds well under neutral to highly basic conditions, with the best results for PCB treatment obtained under highly basic conditions. Enough base is added to neutralize the protons released from the hydrolysis reactions and still remain a neutral or basic solution. Basic conditions are maintained by the addition of moderate or strong bases such as sodium hydroxide, potassium hydroxide, calcium hydroxide, sodium carbonate, and trisodium phosphate.

In one embodiment of the invention, the hydrolysis reactions are performed in a stainless steel pressure vessel with an internal immersion heater. Thorough mixing is needed to minimize mass transfer resistance and increase interfacial surface area for faster hydrolysis. The vessel is fitted with an electronic pressure transducer and overpressure relief valve. All components in contact with the internal fluid are either Teflon coated or stainless steel. The combination of powerful mixing and a high reaction temperature (about 100–120° C.) significantly reduces the time required for complete hydrolysis from years to several hours. The reaction proceeds even more rapidly at temperatures greater than 120° C., but the vessel must be engineered to withstand the higher temperature and pressure. Likewise, the reaction can also be performed at temperatures less than 100° C., but the hydrolysis will take more time.

As the hydrolysis of volatile organics proceeds to completion, the pressure inside the hydrolysis vessel will decrease, assuming that the products or intermediates formed are less volatile than the starting material. The formation of more volatile intermediates may cause an initial increase in pressure, which will fall off rapidly as the less volatile final products are formed.

For the hydrolysis of 1,1,1-trichloroethane, analyses of the hydrolysis w product liquid showed that more than a single product was formed. Hydrolysis involves not only the breakage of C—Cl bonds, but also breakage of C—C bonds and subsequent rearrangements. Although acetic acid (or acetate ion under basic conditions) is the primary product, other products are produced: chloromethane, methylene chloride, chloroform, carbon tetrachloride and 1,1,2-trichloroethane. In addition, a small amount of insoluble material may be formed during hydrolysis, but this result is not detrimental. These materials, particularly unsaturated or aromatic compounds, are easily destroyed by peroxydisulfate in the subsequent oxidation step.

Direct Chemical Oxidation

The products of the first step hydrolysis reactions are subsequently reacted with peroxydisulfate under conditions for direct chemical oxidation (DCO). DCO is a non-thermal (i.e., <350° C. as defined by conventional industry nomenclature), ambient pressure, aqueous-based technology for the oxidative destruction of the organic components of hazardous or mixed waste streams. The process uses solutions of peroxydisulfuric acid or its salts (typically sodium, potassium, or ammonium) to completely mineralize the organics to carbon dioxide, water, and inorganic residues such as chlorides, nitrates, phosphates, carbonates, and sulfates. The expended oxidant may be electrochemically regenerated to minimize secondary waste. The net waste treatment reaction is given by Equation 2:

$$S_2O_8^{2-} + \text{(organics)} \Longrightarrow 2HSO_4^- + (CO_2, H_2O, \text{inorganic residues}) \quad (2)$$

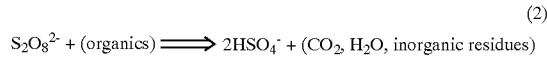

Peroxydisulfate is one of the strongest chemical oxidants known (oxidation potential=+2.05V), and is exceeded only in oxidative power by fluorine, ozone, and oxyfluorides, none of which are suitable for condensed waste treatment. Peroxydisulfate is far more reactive than hydrogen peroxide and readily oxidizes materials such as chlorinated hydrocarbons, oils, greases, and plastics. The oxidation potential of peroxydisulfate is high enough to oxidize nearly all organics, and thus the process is virtually "omnivorous." Oxygen gas will also be produced from the direct oxidation of water by peroxydisulfate, although this reaction occurs at a much slower rate than the oxidation of organics.

The active oxidizing agent is the sulfate free radical ($SO_4^-\cdot$), which is generated by the activation of peroxydisulfate solutions:

$$S_2O_8^{2-} \Longrightarrow 2SO_4^-\cdot \quad (3)$$

This radical-generation process may be achieved at temperatures ranging from below ambient to greater than 105° C. In the presence of a catalyst such as platinum, silver, or copper, the reaction proceeds rapidly even at low temperatures (20–50° C.); however, a metal then is introduced into the waste. The preferred approach is to use mild thermal (70–105° C.) or UV activation; higher temperatures may of course be used for even more rapid processing.

The reaction of the sulfate free radial with the organic and water results in a cascade of active oxidants including organic free radical fragments, hydroxyl free radicals (OH·), peroxymonosulfate (a strong industrial bleach), hydrogen peroxide, and nascent oxygen. An important additional feature of the generation of the sulfate free radical is that $SO_4^-\cdot$ can add to certain insoluble organic compounds (e.g., chars, oils) and promote their solution or emulsification in sulfated form. Unsaturated organic molecules, which are normally insoluble in water, are readily attacked at double and triple C—C bonds to form water soluble organic acids.

In the present invention, volatilization of metals and radionuclides present in the original waste stream is drastically reduced, if not altogether eliminated. Like all aqueous phase destruction techniques, the treatment occurs in a wetted medium without generation of dust. The present method results in products suitable for further recovery or disposal of inorganic residuals by conventional techniques (precipitation, ion exchange or electrolytic recovery, encapsulation for burial). The high heat of evaporation and heat capacity of water buffers the system against thermal runaways.

The ammonium (or sodium) hydrogen sulfate produced as a by-product of peroxydisulfate oxidation can be recycled in a flowing electrolyte cell to minimize secondary waste. The cell may use a platinum or glassy carbon anode, a graphite or oxygen-depolarized cathode, and a porous ceramic separator to prevent cathodic reduction of the product. The anodic reaction is given by Equation 4:

$$2NH_4HSO_4 \Longrightarrow (NH_4)_2S_2O_8 + 2H^+ + 2\,e^- \quad (3)$$

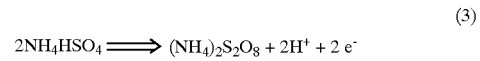

Oxygen, and possibly ozone, are also produced as off-gases. The cathodic reaction is the reduction of protons, or of water itself, to form hydrogen gas. This gas may be oxidized to water (in a catalyzed bed), and the water internally recycled. In applications where the production of hydrogen gas is not desirable (such as in a confined plant), the cathodic reaction can be replaced with oxygen reduction using a porous gas diffusion electrode. This modification also reduces the cell voltage by 1V (about 20%).

Solutions of peroxydisulfate are stable almost indefinitely at room temperature or slightly below, and can be stored as a solid or a wet slurry. The oxidant becomes reactive only at elevated temperatures or through contact with the catalysts described above. Thus, peroxydisulfate can be produced and stockpiled for later use.

The oxidation may be done under conditions of virtually any pH, i.e., directly on the hydrolysis output, or alternatively, the solution may be acidified using sulfuric acid before the oxidation step. For PCB-contaminated waste, the solution is kept strongly basic (pH>13) through the addition of a strong base such as potassium or sodium hydroxide.

There are two important differences between operating in the acidic and basic pH regimes. First, in basic media, the product of organic carbon oxidation is carbonate ions, which remain in solution (or can precipitate out) until the pH drops below about 6. At this point, carbon dioxide is rapidly evolved. The drop in pH from basic to acidic is due to the reduction of peroxydisulfate by the organic, with bisulfate as the product. In acidic media, the oxidation evolves carbon dioxide almost immediately after sufficient thermal activation (>70° C.). The second difference is that in acidic media, the organic chloride may be partly released as chlorine gas, which can be segregated from the waste and converted to NaCl. In base, no chlorine gas is evolved, at least until the solution pH falls to values of 1–2 (where the pH drop is again due to the reduction of peroxydisulfate).

Integrated System

Referring again to the FIGURE, an illustrative embodiment of the integrated system is shown that includes a hydrolysis vessel 10, a feed tank 12, three reactors 14,16,18 for direct chemical oxidation, an off-gas treatment tank 20, an oxidant make-up tank 22, an electrochemical cell 24, and a surge tank 26. The electrolysis cell 24 is secondary equipment for the regeneration of oxidant. Common materials of construction for the process are perfluorinated polymers such as Teflon® or Kynar®, coated stainless steel, glass or ceramics, or materials such as epoxies, tars or some plastics such as polypropylene and high density polyethylene (which are only slowly degraded).

The organic substrate is first pumped into the hydrolysis vessel 10, followed by the appropriate quantity of buffered or basic solution depending on the hydrolysis pH desired. The hydrolysis vessel 10 is made of stainless steel and is equipped with an immersion heater, a double mechanical seal mixer, an electronic pressure transducer, and a pressure relief valve. Fluids are pumped in and out of the vessel 10 using appropriate valving and peristaltic pumps. The contents are heated to a temperature of about 100–120° C., resulting in a pressure build-up of about 100 psi (or ~10 atm.).

Following a hydrolysis run, the hydrolyzed solution may be fed directly into the first oxidation reactor 14, or transferred to a feed tank 12 as shown in the FIGURE, where oxidant can be added at room temperature. Excess oxidant (over stoichiometric) is needed for more favorable kinetics and throughput. The feed tank 12 facilitates the mixing of the hydrolysis products with oxidant and acid (if operating in the acidic regime) at room temperature and atmospheric pressure before the solution in the feed tank 12 is injected into the first reactor 14 and cascaded through the oxidation reactor system 14,16,18. Additional oxidant is fed into the reactors 14,16,18 from an oxidant make-up tank 22.

The oxidation system illustrated in the FIGURE shows three reactors 14,16,18, although the chemical oxidation can take place in just one or two reactors, or in more than three. Using multiple stages results in better thermal control and more complete destruction of the organics (e.g., >99.9%) and reduces the amount of peroxydisulfate used in the process. The solution containing oxidation products (including the expended oxidant) from the first reactor 14 is fed into the second 16; the products of the second reactor 16 are likewise fed into the third reactor 18 for final processing.

The reactors 14,16,18 are typically made of glass or Teflon coated steel and have external magnetic stirring, internal heating, and a reflux condenser to prevent loss of organics through volatilization. The flow rate and residence time in the reactors 14,16,18 can be carefully controlled so that desirable destruction removal efficiencies are achieved. The off-gas (e.g., $CO_2$, $O_2$, $Cl_2$) from each reactor 14,16,18 is pumped through a condenser, and then each output is combined into one common stream, which is fed into an off-gas treating tank 20 for collection, possible treatment, and analyses to quantitatively determine the destruction efficiency of the process. The exact composition of the off-gas stream will depend on the particular waste stream being processed.

As DCO is a chemical treatment, effectiveness is maximized by increasing the surface area of the waste material in contact with the oxidant solution. Mixing the reaction fluid in each DCO reactor is easily achieved since the fluid is a single homogeneous phase. Mixing may be accomplished by mechanical stirring, and facilitated by shredding or pulverizing solids.

The third reactor 18 shown in the FIGURE may be used as a polisher, where oxidant concentration and operating temperature vary in order to completely destroy any remaining organics in the solution. The organic-free solution can then be discharged into a surge tank 26 or passed to an electrolysis cell 24 for the regeneration of peroxydisulfate from the expended oxidant to reduce cost and minimize the oxidant consumption.

The foregoing description of preferred embodiments of the invention is presented for purposes of illustration and description and is not intended to be exhaustive or to limit the invention to the precise form disclosed. Many modifications and variations are possible in light of the above teaching. The scope of the invention is to be defined by the following claims.

What is claimed is:

1. A method for the treatment of organic waste, comprising:

hydrolyzing organic waste at a temperature of about 100 to about 120 degrees C to form a substantially single phase water-based solution comprising organic compounds; and oxidizing the organic compounds with peroxydisulfate to form carbon dioxide, water, and inorganic residues.

2. The method as recited in claim 1, wherein the hydrolyzing step is carried out by hydrolyzing volatile organic waste and water-insoluble organic waste to form water soluble organic compounds.

3. The method as recited in claim 1, wherein the hydrolyzing step is carried out by hydrolyzing water-insoluble, halogenated organic waste to form water soluble organic compounds.

4. The method as recited in claim 1, wherein the hydrolyzing step is carried out at greater than atmospheric pressure.

5. The method as recited in claim 1, wherein the hydrolyzing step is carried out under pH conditions of about 7 or greater.

6. The method as recited in claim 1, wherein the oxidizing step is carried out at temperatures in the range of about 20–105° C.

7. The method as recited in claim 1, wherein the oxidizing step is carried out in the presence of a metal catalyst.

8. The method as recited in claim 1, wherein the oxidizing step is carried out at atmospheric pressure.

9. The method as recited in claim 1, wherein the oxidizing step is carried out at temperatures in the range of about 70–105° C.

10. The method as recited in claim 1, wherein the oxidizing step is carried out under basic pH conditions.

11. The method as recited in claim 1, wherein the oxidizing step is carried out under a pH greater than 13, and wherein the organic waste includes polychlorinated biphenyl compounds.

12. The method as recited in claim 1, wherein the oxidizing step is carried out under neutral pH conditions.

13. The method as recited in claim 1, wherein the oxidizing step is carried out under acidic pH conditions.

14. The method as recited in claim 1, wherein the peroxydisulfate is reduced to sulfate products, and further comprising electrochemically recycling the sulfate products into peroxydisulfate.

15. A method for treating an organic waste, said method comprising: hydrolyzing organic waste at a temperature of about 100 to about 120 degrees C and at greater than atmospheric pressure to form a substantially single phase water-based solution comprising organic compounds; and oxidizing the organic compounds with peroxydisulfate at a temperature in the range from about 20 to about 105 degrees C to form carbon dioxide, water, and inorganic residues.

* * * * *